US007635212B2

(12) United States Patent
Seidler

(10) Patent No.: US 7,635,212 B2
(45) Date of Patent: Dec. 22, 2009

(54) ILLUMINATED ELECTRICAL CENTER

(75) Inventor: Robert J. Seidler, Warren, OH (US)

(73) Assignee: Delphi Technologies, Inc., Troy, MI (US)

( * ) Notice: Subject to any disclaimer, the term of this patent is extended or adjusted under 35 U.S.C. 154(b) by 113 days.

(21) Appl. No.: 11/724,483

(22) Filed: Mar. 15, 2007

(65) Prior Publication Data
US 2008/0225545 A1 Sep. 18, 2008

(51) Int. Cl.
*F21S 8/10* (2006.01)
(52) U.S. Cl. .................. 362/545; 362/459; 362/494; 362/540; 362/544; 362/546
(58) Field of Classification Search ............ 362/249, 362/459, 494, 540, 544–546
See application file for complete search history.

(56) References Cited

U.S. PATENT DOCUMENTS

| 5,715,135 | A | 2/1998 | Brussalis et al. |
| 5,808,373 | A | 9/1998 | Hamanishi et al. |
| 6,360,438 | B1 | 3/2002 | Gladd et al. |
| 6,616,313 | B2 | 9/2003 | Furst et al. |
| 6,699,067 | B1 | 3/2004 | Zhao et al. |
| 2003/0147221 | A1 | 8/2003 | Blasko et al. |

FOREIGN PATENT DOCUMENTS

JP 2085040 3/1990

*Primary Examiner*—Sandra L O'Shea
*Assistant Examiner*—Meghan K Dunwiddie
(74) *Attorney, Agent, or Firm*—Thomas N. Twomey

(57) ABSTRACT

An electrical center assembly used in a vehicle provides ambient light to the assembly and the area around the assembly using a light-emitting diode. The electrical center assembly generally includes a housing, an electrically conducting link, removable electrical components and at least one light-emitting diode for illuminating the electrical center.

18 Claims, 4 Drawing Sheets

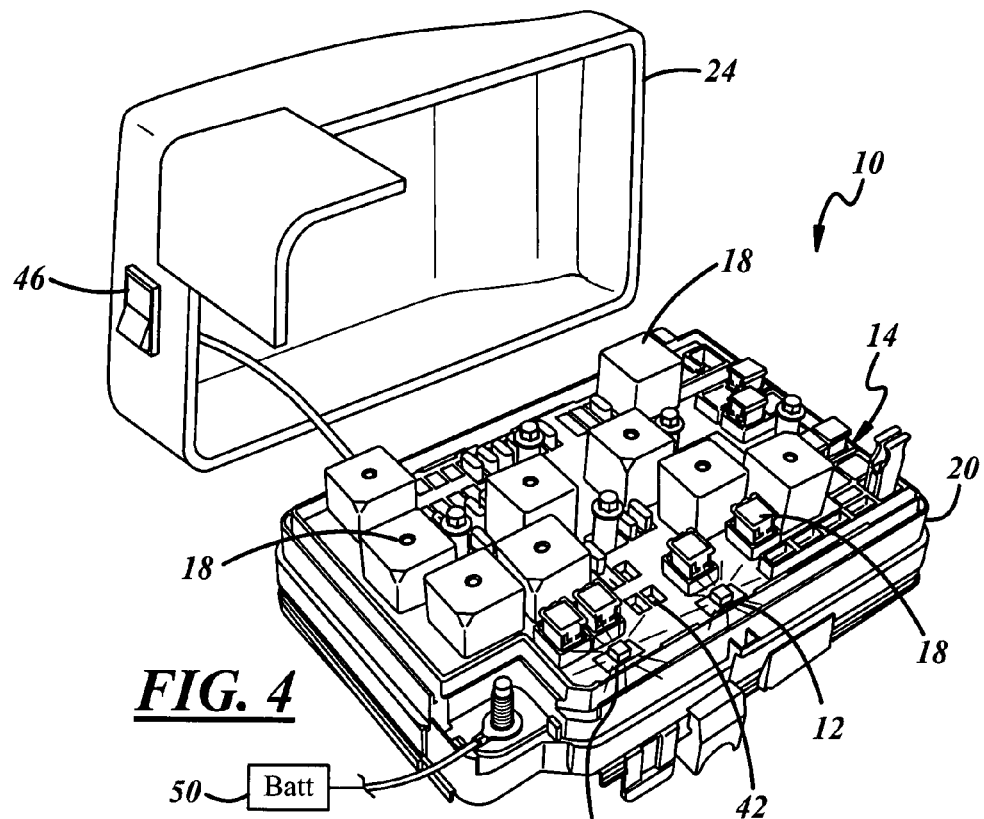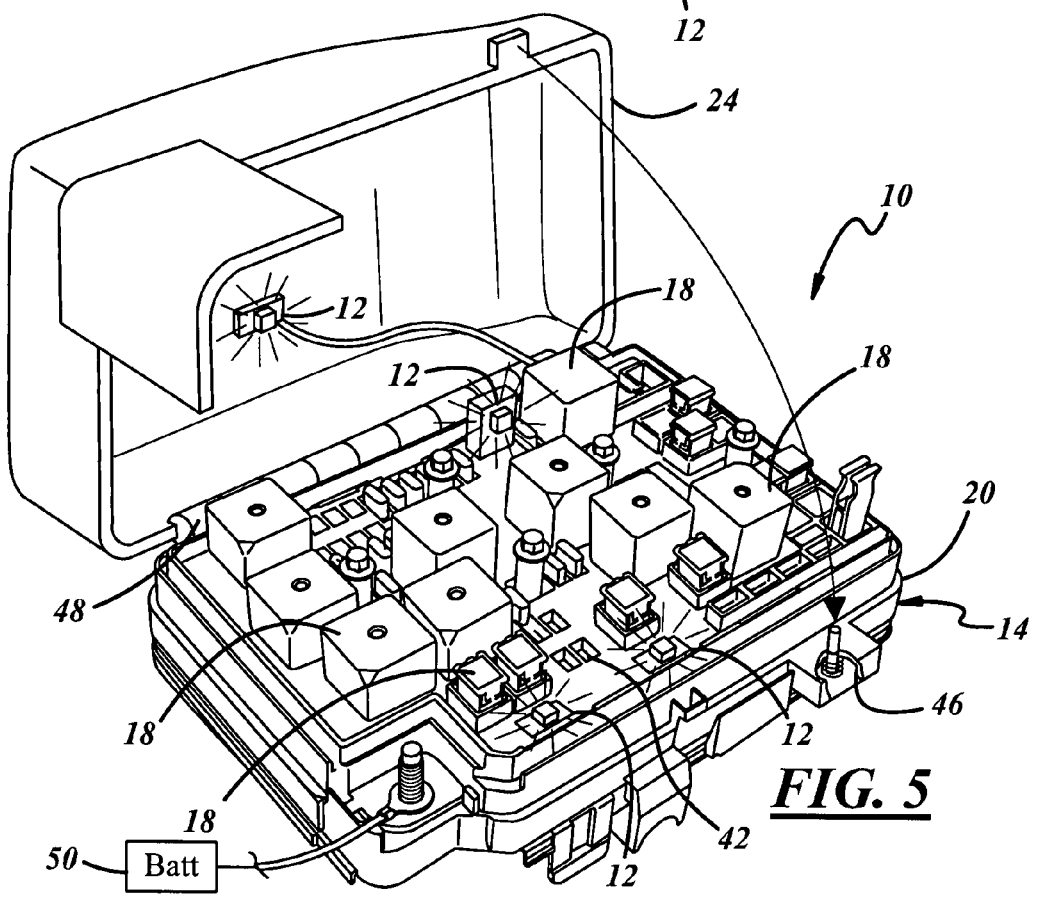

ILLUMINATED ELECTRICAL CENTER

BACKGROUND OF THE INVENTION

This invention relates generally to electrical centers and more specifically to the illumination of electrical centers.

Electrical centers provide electrical current flow to electrical components using a common power source and are well known in the art. The centers are mounted in a variety of locations in and on a vehicle. Often, the electrical centers are mounted in dark locations; and so when it is necessary to service the centers, the user must provide illumination with a portable light source. This can be impracticable because typically the service provider does not carry a portable light source. Even when using a portable light source, such as a flashlight, the user must hold the source with one hand while performing service, which can be tiresome and awkward. Incandescent light bulbs have been used for illumination, but they have some limitations. Bulbs are somewhat fragile. They consume significant amounts of current. They generate heat, and are frequently too bulky for mounting in a streamlined electrical center design.

SUMMARY OF THE INVENTION

According to one conception or implementation of an electrical center assembly for use in a vehicle, a housing may be adapted to connect with an electrical source and include at least one electrical conducting link carried by the housing for conducting electrical current from the electrical source into the housing, at least one removable electrical component carried by the housing and electrically connected to the electrical conducting link and at least one light-emitting diode carried on the housing and electrically connected to the electrical conducting link for illuminating the electrical center.

Another conception or implementation involves a method of providing for illumination for an electrical center. The steps include providing an electrical center for installation in a vehicle where the electrical center includes a housing, arranging an electrical link within the housing for carrying electrical current through the housing, attaching electrical components to the housing for regulating electrical current, and associating a light-emitting diode with the housing and the electrically conducting link to illuminate the electrical center during servicing operations after the electrical center has been installed in a vehicle.

Yet another conception or implementation involves a method of using a light-emitting diode that emits substantially white light. The steps include providing an electrical center capable of receiving an electrical source for mounting in a vehicle whereby the electrical center regulates electrical current through at least a portion of the vehicle. The method also includes attaching electrical components to the electrical center for regulating electrical current and associating the light-emitting diode with the housing to provide light to service the electrical center after the electrical center has been installed in a vehicle.

Electrical centers equipped with light-emitting diodes help service providers see the center when providing service; and they do so while consuming small amounts of electrical current and providing a long service life. Along with those benefits, electrical centers using light-emitting diodes may also provide a more pleasing aesthetic style than previous electrical centers.

BRIEF DESCRIPTION OF THE DRAWINGS

FIG. 4 is a perspective view illustrating an embodiment of an electrical center assembly using a switch mounted on a cover for operating light-emitting diodes mounted on the housing.

FIG. 5 is a perspective view illustrating another embodiment of an electrical center assembly using light-emitting diodes mounted on a hinged cover and operated by a switch mounted on the housing.

DETAILED DESCRIPTION OF THE PREFERRED EMBODIMENTS

Figure 1:
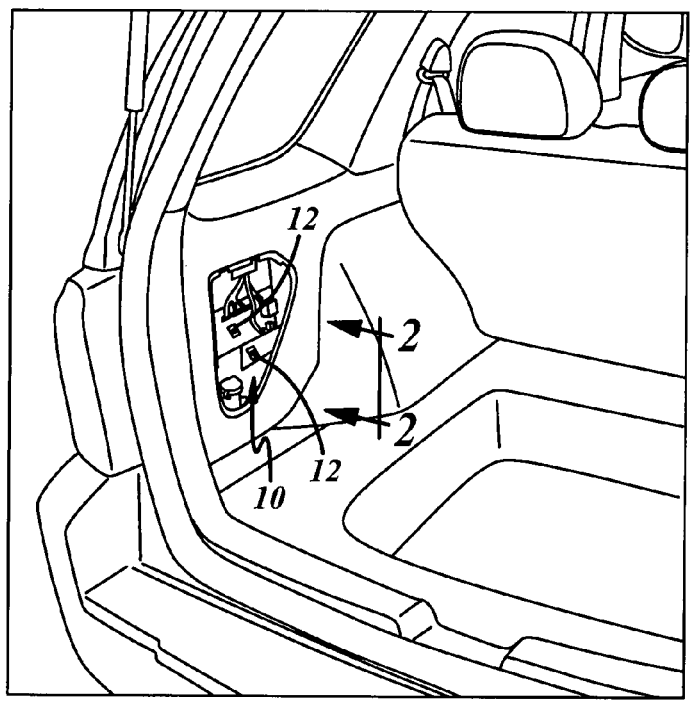
FIG. 1 is a perspective view of an electrical center assembly mounted in a vehicle, where the electrical center uses a light-emitting diode.
Figure 2:
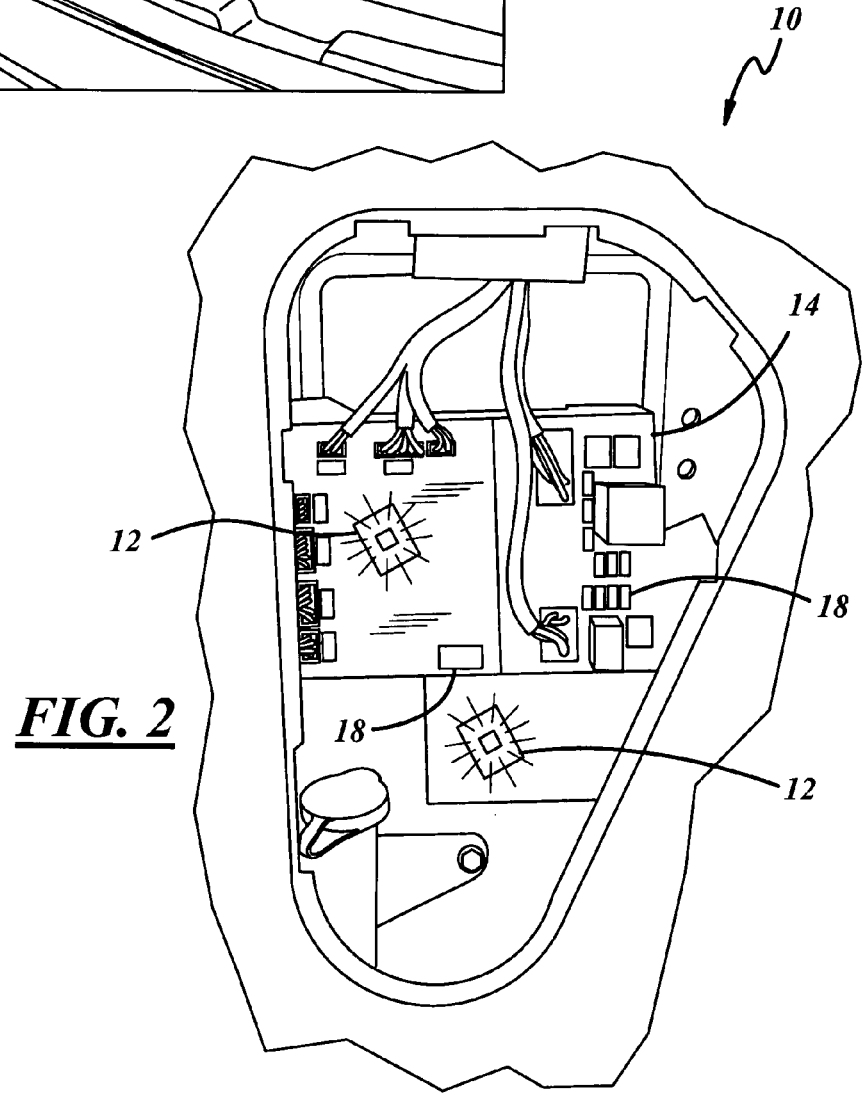
FIG. 2 is a closer perspective view of the electrical center assembly in FIG. 1.

Referring in more detail to the drawings, FIGS. 1 and 2 illustrate an implementation of an electrical center assembly generally shown at 10 using a light-emitting diode 12 for illumination. FIGS. 1 and 2 show the electrical center 10 as it may be mounted in a vehicle. In this implementation, the electrical center 10 is hidden behind an automotive interior panel, but the electrical center 10 may also be mounted under the hood of a vehicle or in any other location where the electrical center assembly 10 may function.

Figure 3:
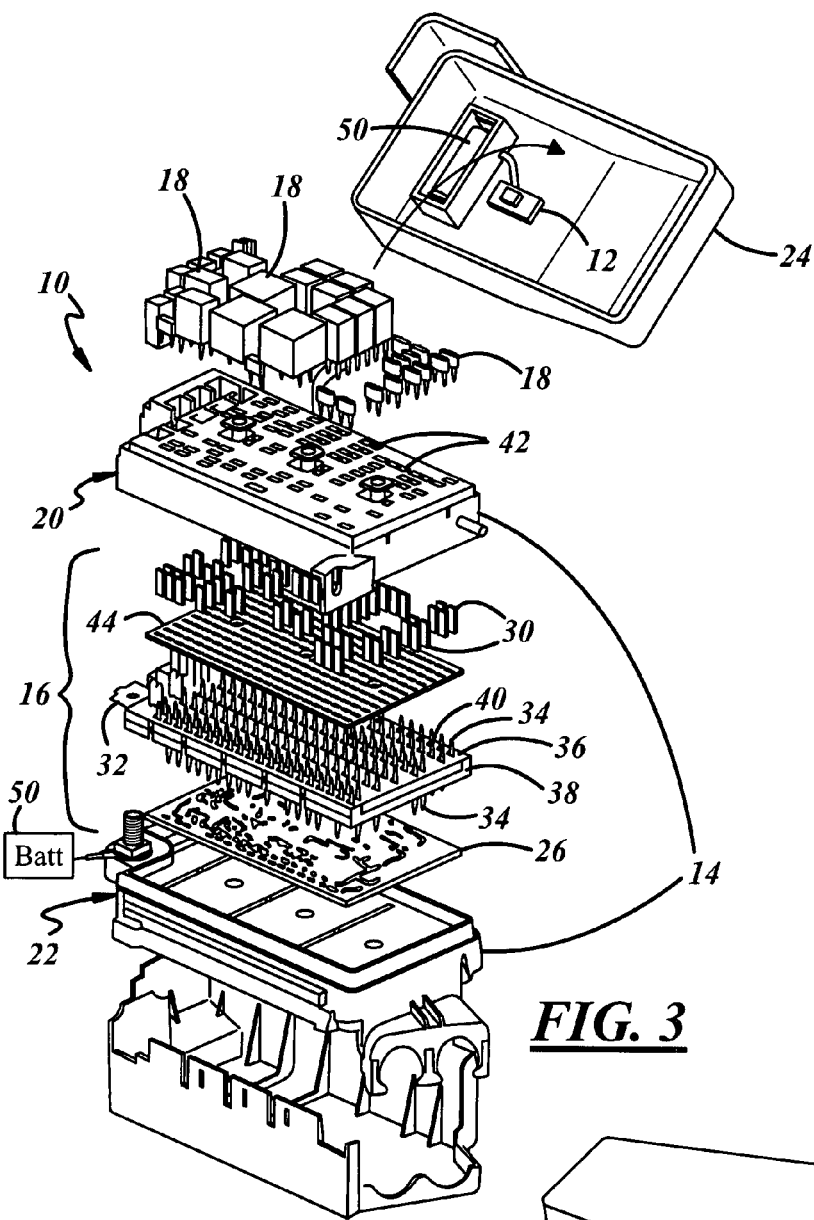
FIG. 3 is an exploded view illustrating an electrical center assembly using a light-emitting diode for illumination.
Figure 7:
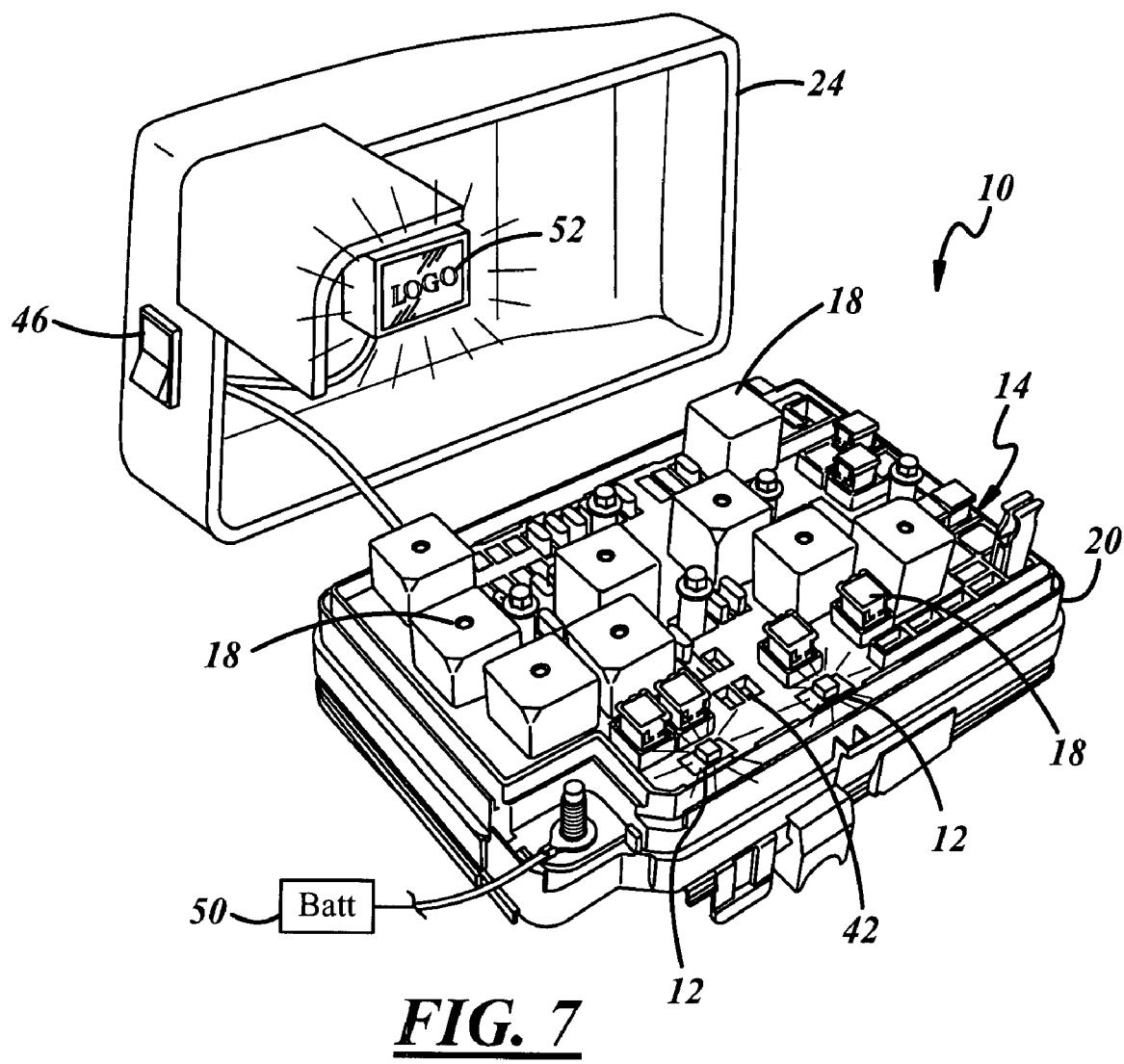
FIG. 7 is a perspective view illustrating yet another implementation of an electrical center using a light-emitting diode for illumination.

Turning to an implementation shown in FIG. 3, the electrical center assembly generally shown at 10 uses a light-emitting diode 12 for illumination. This implementation includes a housing generally indicated at 14 that carries an electrical conducting link generally indicated at 16, removable electrical components 18 and a light-emitting diode 12 for illuminating the electrical center 10. Other names are sometimes used to describe an electrical center 10. For example, electrical centers 10 may sometimes be called bussed electrical centers, bussed electrical connectors or electrical distribution centers. The electrical center 10 may provide electrical connections between electrical devices associated with the vehicle, such as fuel pumps, radios and lights, and removable electrical components 18 that may plug into the housing 14 of the electrical center 10. Electrical centers 10 used in vehicles generally use a housing 14 and may be powered by electrical sources 50 such as batteries, alternators, generators or any other device capable of providing electrical current. In turn, these sources 50 may power the light-emitting diode 12. As shown in FIGS. 4, 5 and 7, the source 50 may be a battery that powers the electrical center 10 and electrically connects to the light-emitting diode 12 via electrically conductive wire or another suitable electrically conductive path. Alternatively, as shown in FIG. 3, the source 50 may be a small battery powering the light-emitting diode 12 by directly linking to the light-emitting diode 12 via electrically conductive wire."

The electrical center housing 14 may take the form of an upper housing 20 and a lower housing 22. In one implementation, the upper and lower housing (20 & 22) each may be substantially rectangular in shape and constructed using a suitable plastic, metal or other light and durable material. The upper housing and lower housing (20 & 22) also may be formed in a variety of different shapes. For example, the upper housing and lower housing (20 & 22) may be square, ovoid or any other shape designers find suitable for mounting in a vehicle. In some designs, the housing 14 may also support a cover 24 for protecting and covering the electrical components 18. Regardless of shape, the upper housing 20 may provide structural support for the electrical components 18 as well as electrical insulation for the electrical center 10. The lower housing 22 may support and insulate a lower routed wire plate 26 that may convey electrical current from the electrical conducting link 16 to electrical devices associated with the vehicle. The wire plate 26 may be a printed circuit board or etched circuit board capable of completing a plurality of circuits. In other implementations, the lower routed wire plate 26 may be substituted with a wiring harness or plurality of wires capable of distributing electrical current to electrical devices.

Figure 6:
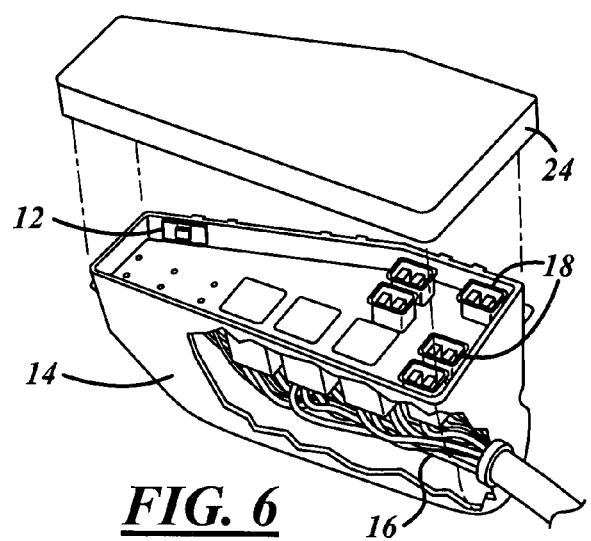
FIG. 6 is a perspective view illustrating another implementation of an electrical center using a light-emitting diode for illumination.

Other electrical center designs are possible as may be seen in FIG. 6. FIG. 6 shows an electrical center 10 using a one-piece housing 14 that replaces the upper and lower housing (20 & 22). In another implementation, the upper and lower housing (20 & 22) may attach to each other while leaving a gap between them for accommodating the electrical conducting link 16. In yet another implementation, the electrical conducting link 16 may provide support for both the upper and lower housing (20 & 22) each attaching to one side of the electrical conducting link 16.

The electrical conducting link 16 electrically connects to removable electrical components 18 carried by the housing 14 using metal connectors 30. As shown in FIG. 6, the electrically conductive link 16 may take the form of electrically conductive wire. Alternatively, as shown in FIG. 3, the electrical conducting link 16 may have a substantially planar structure with one side facing the upper housing 20 while another side faces the lower housing 22. Electrical current may be carried into the electrical center 10 via the link 16. In order to efficiently carry current into the electrical center 10 and electrically connect the electrical components 18 and electrical devices, the electrical conducting link 16 may have several components. One such component is a bus plate 32. A bus plate 32 conducts electrical current and may have a flat body formed from stamped metal. The body of the bus plate 32 may also use stamped-metal circuit components 34. These circuit components may take the form of tabs articulated in a substantially perpendicular position in relation to the bus plate 32. In one implementation, the components 34 may be constructed of metal but could also be fashioned from any suitable material capable of conducting electrical current. These components 34 may include female terminals, male terminals or a tuning fork terminal protruding outwardly from the bus plate 32. The stamped metal circuit components 34 may be situated initially in a co-planar relationship with the bus plate 32 and later bent approximately ninety degrees to support a bus plate insulation assembly 44 and upper and lower press-fit plates (36 & 38) while electrically connecting to metal connectors 30, the lower routed wire plate 26, electrical components 18, or any other electrically conductive element intended to be included by designers.

The bus plate 32 may be insulated using other components of the electrical conducting link 16 such as upper and lower press-fit plates (36 and 38) that surround and insulate the bus plate 32. The shape of the upper and lower press-fit plates (36 and 38) may closely mimic the shape of the bus plate 32. For instance, if the bus plate 32 has a substantially planar and rectangular shape the upper and lower press-fit plates (36 and 38) may also have a substantially planar and rectangular shape but additionally may have slots 40 closely conforming to the cross-sectional shape of the stamped metal circuit components 34. These slots 40 traverse the entire height of each press-fit plate (36 and 38). Both the upper and lower press-fit plate (36 and 38) may then be placed on opposite sides of the bus plate 32 whereby the stamped metal circuit components 34 may fit into and extend through the slots formed in the upper and lower plates (36 and 38). When the components 34 attached to the bus plate 32 fit through the slots 40, one side of the upper press-fit plate 36 contacts one side of the lower press-fit plate 38 thereby encasing the bus plate 32 providing support and insulation. The upper and lower press-fit plates (36 and 38) may be made of plastic, foam or any other material having electrically insulating properties and capable of providing support.

Removable electrical components 18 of an electrical center 10 generally attach to the upper housing 20, but could be attached anywhere on the housing 14 and electrically connect to the electrical conducting link 16. Electrical components 18 may be fuses, fusible links, circuit breakers, relays or any other device that regulates an electrical circuit. Fuses used in electrical centers 10 may be plug in fuses of various amperage ratings, also called blade or spade fuses, that use a plastic body and two metal prongs. Manufacturers produce fuses in a variety of sizes and amperage ranges that are denoted by the names, Mini Fuse, Maxi Fuse and ATO. Electrical components 18 may also be electric relays. The electrical components 18 may plug into sockets 42 provided by the housing 14.

The sockets 42 may be openings of various sizes and shapes that allow electrical components 18 to electrically connect to metal connectors 30 through the housing 14. Metal connectors 30 may be square, rectangular, fork-shaped or any other suitable form. The connectors 30 may also be constructed from metal or any material that reliably conducts electrical current between electrical components 18 and the link 16. The connectors 30 may be held in place by a bus plate insulation assembly 44 that may attach to the upper assembly 20.

A cover 24 may also attach to the electrical center 10. The cover 24 may attach to the upper housing 20, the lower housing 22 or any physical mounting point on or near the electrical center 10 suitable to physically support the cover 24 preventing it from becoming unintentionally separated from the electrical center 10. For example, in one implementation, the cover 24 may be secured to the electrical center 10 with a thumb wheel attached to a threaded post and screwed into the upper housing 20. In another implementation, such as the one illustrated in FIG. 5, the cover 24 may be attached using a hinge 48 at one side of the upper housing 20. The hinge 48 may be a piano-type hinge or any other hinge 48 suitable to support the cover 24. Or, in other designs, the cover 24 may have flanges extending from at least one side and interlock with a receiving socket in the lower housing 22 that provides support. The cover 24 may be constructed from a variety of materials much like the upper and lower housing (20 & 22). For example, the cover could be manufactured from a plastic, metal or any other material suitably light, strong and durable. The cover 24 may be manufactured from the same material as the upper or lower housing (20 & 22) or may be manufactured using a dissimilar material. The cover surface or structure also has characteristics that make it suitable for mounting a light-emitting diode 12. Other arrangements and substitutions of these elements are possible while still building an effective electrical center 10.

A light-emitting diode 12 mounts to the electrical center 10 in any manner or position where the diode 12, when supplied with electric current, provides sufficient ambient light to the electrical center 10. Light-emitting diodes 12 are semi-conductor devices well known to those in the art. They emit incoherent narrow-spectrum light when electrically biased in the forward direction and produce a form of electroluminescence. Different colors may be emitted depending on the composition and condition of the materials used in the light-emitting diode 12. The light waveforms may be infrared, visible or near ultraviolet. Light-emitting diodes 12, that emit visible light and may be used in conjunction with the electrical center 10, emit any color light including but not limited to red, green, orange, orange-red, yellow, blue and white. An effective implementation of an electrical center 10 may use a light-emitting diode 12 emitting substantially white light but other colors may also be implemented with success. As an example, light-emitting diodes 12 that emit substantially white light may use an InGaN—GaN structure that emits blue light at a wavelength between 450 nm-470 nm, but additionally employs a yellowish phosphor coating sometimes made from cerium doped yttrium aluminum garnet (YAG) crystals which have been powdered and bound in a type of viscous adhesive. While the light-emitting diode emits blue light, the YAG crystals covering the light-emitting diode 12 convert part of the blue light to a broad spectrum based at about 580 nm that provides yellow light.

Another effective white light-emitting diode 12 may be constructed by coating near ultraviolet (NUV) light-emitting diodes 12 with a mixture of high-efficiency europium-based red and blue-emitting phosphors plus green-emitting copper and aluminum-doped zinc sulfide. This construction method is less efficient than using a blue light-emitting diode 12 coated with YAG crystals but produces light with better spectral characteristics and represents color more naturally. Yet another light-emitting diode 12 design that emits white light uses no phosphors and is based on homoepitaxially grown zinc selenide (ZnSe) on a ZnSe substrate that simultaneously emits blue light from its active region and yellow light from the substrate. Other light-emitting diode designs are also possible, such as organic light-emitting diodes (OLED). New and more efficient light-emitting diode designs, such as the OLED, that emit both white and other color light may work equally well when used in conjunction with the electrical center assembly 10.

Designers have wide latitude for mounting the light-emitting diode 12 to the electrical center 10. For example, the size, amount and mounting position of the light-emitting diodes 12 can be varied according to application requirements. Light-emitting diodes 12 may produce a focused light allowing the designer to direct the emitted light precisely where desired. Additional light-emitting diodes 12 may be mounted to the electrical center 10 giving the designer additional flexibility to provide a varying amount of ambient light. Alternatively, the light-emitting diode 12 may be constructed in a manner that provides unfocused ambient light. For example, the light provided by the light-emitting diode 12 may radiate in all directions effectively mimicking an incandescent light bulb's light output. Substituting an incandescent light bulb with a light-emitting diode 12 greatly reduces power consumption and increases reliability by producing more light per watt while simultaneously providing a smaller, more durable package having a longer operating life. Designers also may modify the amount of light a light-emitting diode 12 provides by modulating the electrical current supplied to the diode 12. While a decrease in current decreases the amount of light provided, the light color remains constant unlike incandescent light bulbs which turn yellow as electric current is reduced. Actuating the light-emitting diode 12 may be accomplished using a switch 46 or the diode 12 may operate continuously whenever electrical current is supplied to the electrical center 10.

The switch 46 may be mounted on the electrical center 10 to actuate the light-emitting diode 12 either manually or automatically. One implementation may use a manual switch 46 to actuate the light-emitting diode 12. There are many manual switches 46 that may be used to actuate light-emitting diodes 12. For example, one switch design could be a single pole-single throw design having the ability to open or close a circuit. Other examples may use a depressible button or toggle design each having the ability to open or close a circuit. Another manual switch implementation may mount the light emitting diode 12 atop a sliding switch 46 where the user moves the light-emitting diode 12 laterally to activate or deactivate the light-emitting diode 46. Yet another possible implementation could use a digitally-actuated analog switch that opens and closes a circuit in response to a microprocessor's output or the output of another device using logic gates. Manual switches 46 may be mounted in a variety of locations on or around the electrical center 10. For instance, a manual switch 46 may be mounted on the upper housing 20, lower housing 22, the cover 24 or in any area surrounding the electrical center 10. The surrounding area could be adjacent to the electrical center 10, on or near the vehicle instrument panel or any other remote location giving the user the ability to manually actuate the light-emitting diode 12. As an example, FIG. 4 illustrates an implementation where a manual switch 46 is mounted on the cover 24.

Another implementation controls a light-emitting diode 12 using a switch 46 that is actuated automatically. The automatically actuated switch 46 turns the light-emitting diode 12 on or off in response to a stimulus. The stimulus may take a mechanical or an electrical form. For instance, an automatic switch 46 may be a biased switch 46 containing a spring that opens or closes a circuit with movement of the electrical center's 10 cover 24 in relation to the upper housing 20 as shown for example in FIG. 5. Common examples of biased switches 46 include push-to-make/push-to-break designs. In the push-to-make example, a mechanical actuator, such as a plunger or piston, is depressed to close a circuit. Upon releasing the mechanical actuator, a spring or other suitable mechanical mechanism returns the actuator to its original open circuit position. Conversely, a push-to-break example accomplishes the opposite whereby depressing the mechanical actuator opens the circuit while releasing it closes the circuit. In one implementation, illustrated in FIG. 5, the switch 46 is mounted to the upper housing 20. While the cover 24 is in a closed position in close relation to the upper housing 20, the mechanical actuator of the switch 46 is depressed and the electrical circuit remains open deactivating the light emitting diodes 12. When the cover 24 is moved in relation to the upper housing 20 creating a greater distance between at least one part of the upper housing 20 and the cover 24, the mechanical actuator is released. A spring or other element returns the mechanical actuator to its biased position and the electrical circuit is closed, activating the light-emitting diode 12. The arrangement of the switch 46 in relation to the cover 24 may be altered for use of a push-to-make design. Other examples of automatic switches 46 suitable for this application may include a timer-operated switch 46 as well as a digitally-actuated analog switch 46 that opens and closes a circuit in response to a microprocessor's output or the output of another device using logic gates. Automatic switches 46 may be mounted in a variety of locations on and around the electrical center as is suitable for a particular application.

The light-emitting diode 12 may also be mounted on the housing 14 in such a way that it illuminates an emblem, logo, slogan or other message that the manufacturer desires. As shown in FIG. 7, the light-emitting diode 12 also may be mounted on the cover 24 and used to provide light through a semi-transparent window 52 on which the emblem, logo, slogan or other message is printed. The semi-transparent window 52 may then be illuminated, bringing more attention to the logo, slogan or message and also may provide ambient light to the electrical center 10. The semi-transparent window 52 may be used in conjunction with a light-emitting diode 12 mounted elsewhere on the housing 14 or near the electrical center 10. This implementation may provide a more prominent brand identity to the electrical center 10 or may provide a style distinction in relation to other electrical centers.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

I claim:

1. An electrical center for use in a vehicle comprising:
a housing adapted to connect with an electrical source;
at least one electrical conducting link carried by the housing for conducting electrical current from the electrical source into the housing;
at least one removable electrical component carried by the housing and electrically connected to the electrical conducting link; the at least one removable electrical component selected from the group consisting of fuses, fusible links, circuit breakers, relays and other devices that regulate an electrical circuit,
at least one light-emitting diode carried on the housing and electrically connected to the electrical conducting link for illuminating the electrical center, the at least one light-emitting diode being positioned to facilitate servicing the at least one removable electrical component.

2. The electrical center as described in claim 1 wherein the light-emitting diode emits substantially white light.

3. The electrical center as described in claim 1 further comprising an electric switch operatively connected with the light-emitting diode for actuating the light-emitting diode.

4. The electrical center as described in claim 3 wherein the housing includes a removable cover and the electric switch is associated with the cover for automatically actuating the light-emitting diode when the cover is moved relative to the housing.

5. The electrical center as described in claim 3 wherein the switch is mounted on the housing for manually actuating the light-emitting diode.

6. The electrical center as described in claim 1 wherein the electrical conducting link is a bus layer.

7. The electrical center as described in claim 1 wherein the electrical conducting link includes one of a bus plate, an electrical conducting wire, a printed circuit board and an electrically conductive metal plate or any combination thereof.

8. The electrical center as described in claim 1, wherein:
the light-emitting diode has contacts that extend through a portion of the housing to contact the electrical conducting link.

9. A method of providing for illumination for an electrical center, the steps comprising: providing an electrical center for installation in a vehicle, where the electrical center includes a housing;
arranging an electrical conducting link within the housing for carrying electrical current through the housing;
attaching electrical components to the housing for regulating electrical current; and
associating a light-emitting diode with the housing to illuminate the electrical center during servicing operations after the electrical center has been installed in a vehicle.

10. The method of claim 9, further comprising the step of:
providing a manually-operated switch electrically connected to the light-emitting diode for operating the light-emitting diode.

11. The method of claim 9, further comprising the step of:
equipping the housing with a cover that substantially covers at least a portion of the housing to provide protection for the electrical components.

12. The method of claim 11, further comprising the step of:
actuating the light-emitting diode in response to a user moving the cover in relation to the housing an electric switch associated with the housing and electrically connected to the light-emitting diode.

13. The method of claim 11, further comprising the step of:
actuating the light-emitting diode in response to a user moving the cover in relation to the housing an electric switch associated with the cover and electrically connected to the light-emitting diode.

14. The method of claim 9, further comprising the step of:
mounting the light-emitting diode on the housing, where the light-emitting diode has contacts that extend through a portion of the housing to contact the link.

15. A method of using a light-emitting diode that emits substantially white light, the steps comprising:
providing an electrical center capable of receiving an electrical source for mounting in a vehicle whereby the electrical center regulates electrical current through at least a portion of the vehicle;
attaching electrical components to the electrical center for regulating electrical current; and
associating the light-emitting diode with the housing to provide light to service the electrical center after the electrical center has been installed in a vehicle.

16. The method of claim 15 further comprising the step of:
affixing a switch to the electrical center and electrically connecting the switch to the light-emitting diode for manual actuation.

17. The method of claim 15 further comprising the step of:
adapting the electrical center to carry a cover capable of covering at least part of the electrical center.

18. The method of claim 17 further comprising the step of:
affixing a switch to the electrical center and electrically connecting the switch to the light-emitting diode for actuating the light-emitting diode in response to a user moving the cover relative to the electrical center.

* * * * *